(12) United States Patent
Huang

(10) Patent No.: US 11,107,455 B1
(45) Date of Patent: Aug. 31, 2021

(54) CONSTANT BEAM PATTERN ARRAY METHOD

(71) Applicant: The United States of America as represented by the Secretary of the Navy, Newport, RI (US)

(72) Inventor: Dehua Huang, Newport, RI (US)

(73) Assignee: The United States of America as represented by the Secretary of the Navy

( * ) Notice: Subject to any disclaimer, the term of this patent is extended or adjusted under 35 U.S.C. 154(b) by 317 days.

(21) Appl. No.: 16/135,208

(22) Filed: Sep. 19, 2018

(51) Int. Cl.
G10K 11/36 (2006.01)
G10K 11/34 (2006.01)
B06B 1/06 (2006.01)

(52) U.S. Cl.
CPC .......... *G10K 11/343* (2013.01); *G10K 11/348* (2013.01); *G10K 11/36* (2013.01); *B06B 1/0637* (2013.01)

(58) Field of Classification Search
CPC .... G02B 26/123; G10K 11/18; G10K 11/343; G10K 11/348; G10K 11/36; B06B 1/0637
See application file for complete search history.

(56) References Cited

U.S. PATENT DOCUMENTS

| | | | |
|---|---|---|---|
| 4,328,569 A | 5/1982 | Trott et al. | |
| 8,002,705 B1* | 8/2011 | Napolitano | G01S 7/52019 600/437 |
| 8,599,648 B1* | 12/2013 | Butler | G10K 11/345 367/138 |
| 9,286,418 B1* | 3/2016 | Butler | G10K 11/32 |
| 9,444,558 B1* | 9/2016 | Carbone | H04B 7/0617 |
| 2011/0222372 A1* | 9/2011 | O'Donovan | G01S 3/8083 367/103 |

OTHER PUBLICATIONS mathworks.com, Adaptive Beamforming, May 2016, mathworks. com.*
Llic Slobodan, Comparing Timoshenko Beam to Energy Beam for Fitting Noisy Data, Nov. 2007, Proceedings of the 8th Asian conference on Computer vision—vol. Part I.*
mathworks.com, Adaptive Beamforming, May 2016, mathworks. com (Year: 2016).*
Llic Slobodan, Comparing Timoshenko Beam to Energy Beam for Fitting Noisy Data, Nov. 2007, Proceedings of the 8th Asian conference on Computer vision—vol. Part I (Year: 2007).*

\* cited by examiner

*Primary Examiner* — Isam A Alsomiri
*Assistant Examiner* — Abdallah Abulaban
(74) *Attorney, Agent, or Firm* — James M. Kasischke; Michael P. Stanley

(57) ABSTRACT

A method for providing a broadband constant beam pattern acoustic array includes providing an array of transducers in a known three dimensional axisymmetric spherical configuration with each transducer element having an associated signal. A user can specify a far field beam pattern for the array. Weightings are calculated for each transducer in the array as being proportional to the voltage that gives the beam pattern power level associated with the bearing for each transducer. Signal power levels for each transducer are modified in accordance with the weightings. The array can be operated for receiving and transmitting signals with a constant beam pattern over a broad range of frequencies.

8 Claims, 7 Drawing Sheets

400 kHz 2000 kHz

CONSTANT BEAM PATTERN ARRAY METHOD

STATEMENT OF GOVERNMENT INTEREST

The invention may be manufactured and used by or for the Government of the United States of America for governmental purposes without the payment of any royalties thereon or therefor.

CROSS REFERENCE TO OTHER PATENT APPLICATIONS

None.

BACKGROUND OF THE INVENTION

(1) Field of the Invention

The present invention is directed to a method for creating an array having a constant beam pattern across a broad frequency range.

(2) Description of the Prior Art

Most directional acoustic transducers and arrays have beam patterns which are frequency dependent. The beam width becomes wide when frequency goes low for a plane piston or a line array. As a result, the spectral content of the transmitted or received signals varies with position in the beam, and thus the fidelity of an acoustic system will depend on the relative orientation of the transmitter and receiver. Constant beam width transducers have been studied and tested, where only the beam width, a limited portion of the beam pattern is maintained as constant. This is up to the half power point of −3 dB beam width control within the main lobe over a certain frequency band.

The beam pattern is generally controlled by applying weightings to acoustic transducers arranged in an array. These weightings can be attenuations or amplifications of the input signal provided to an active array for transmitting acoustic energy or of the output signal from a passive array for receiving acoustic energy. Weightings associated with each transducer are calculated from a shading function or a windowing function that is known to give a desired beam pattern from an array.

Window functions are also known as apodization functions or tapering functions. Many different windowing functions are known in the art for giving particular beam patterns. These include rectangular windows, triangular windows, sine windows, Welch windows, Hann and Hamming windows, Blackman windows, Nuttall windows, flat top windows, Rife-Vincent windows, Gaussian windows, Dolph-Chebyshev windows, Planck-Bessel windows, and many others. It is known to apply these windowing and shading functions to linear and curved arrays. Weightings associated with transducers in an array can be calculated by averaging the value of the shading function across the surface area of the transducer.

Prior art constant beam width transducers typically sacrifice management of side lobes and nulls to the goal of providing a constant beam width. Often it is desirable to have a specific beam pattern. In a typical lobed beam pattern having a main lobe and side lobes, it is desirable to steer the main lobe toward a target of interest while placing noise sources at beam pattern nulls. The side lobes can also be controlled for other environmental sounds.

Thus, it is desirable to have an array that is capable of transmitting and receiving acoustic signals with a constant beam pattern across a broad range of frequencies.

SUMMARY OF THE INVENTION

It is a first object of the present invention to provide a constant beam pattern for an acoustic array over a broad range of frequencies.

Another object is to allow such array to have a far field beam pattern specified by a user.

Accordingly, a broadband constant beam pattern acoustic array method is provided that includes utilizing an array of transducers in a known three dimensional axisymmetric configuration with each transducer element having an associated signal. A user can specify a far field beam pattern for the array. Weightings are calculated for each transducer in the array as being proportional to the voltage that gives the beam pattern power level associated with the bearing for each transducer. Signal power levels for each transducer are modified in accordance with the weightings. The array can be operated for receiving and transmitting signals with a constant beam pattern over a broad range of frequencies.

BRIEF DESCRIPTION OF THE DRAWINGS

Reference is made to the accompanying drawings in which are shown an illustrative embodiment of the invention, wherein corresponding reference characters indicate corresponding parts, and wherein.

DETAILED DESCRIPTION OF THE INVENTION

Figure 1:
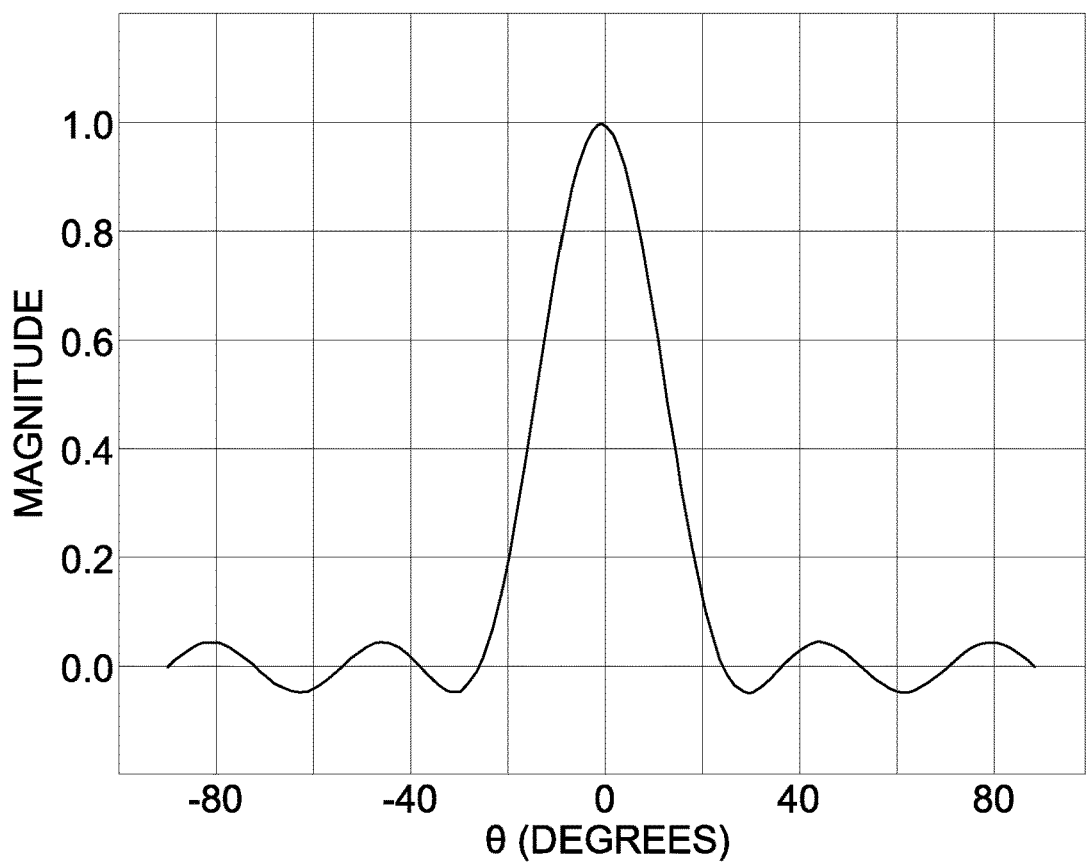
FIG. 1 is a graph of a Dolph-Chebyshev shading function utilized in array design.

Disclosed herein is a design concept for a broadband constant beam pattern (CBP) transducer. With only one shading function for all frequencies in a broadband, the CBP beam patterns are maintained as "constant" not only within −3 dB beam width to the main lobe, but also for all levels and angular positions to the side lobes. The locations of nulls can also be defined before the transducer array is operated, because of the predefined Legendre polynomials applied.

If the radial velocity on the surface of a radius a sphere is equal to $U_0 V(\theta) \exp(-i\omega t)$, where $U_0$ is a constant value to the peak of particle velocity, and $V(\theta)$ is the axially symmetric dimensionless angular radial particle velocity distribution on the surface of the sphere, $\omega$ is the angular frequency, then the general corresponding acoustic pressure outside of the sphere will be:

$$p(R, \theta, t) = e^{-i\omega t} \sum_{v}^{\infty} B_v P_v(\cos(\theta)) h_v(kR) \quad (1)$$

after solving the Helmholtz equation for the axially symmetrical case, here R and $\theta$ are for spherical coordinates, $B_v$ is a coefficient, $h_v$ is first kind spherical Hankel function of v degree, c is the sound speed of the surrounding fluid, and $k=\omega*c$ is the wave number. The boundary condition on the sphere surface is $$\left.\frac{\partial p(R, \theta)}{\partial R}\right|_{R=a} = i\rho\omega U_0 V(\theta); \quad (2)$$

where $\rho$ is the medium density, a is the radius of the sphere. The angular radial particle velocity distribution $V(\theta)$ can be expanded by the following Legendre polynomials series $P_v(\cos(\theta))$ $$V(\theta) = \sum_{v=0}^{\infty} A_v P_v(\cos\theta) \quad (3)$$

and the quantities $A_v$, are the coefficients in the Legendre series expansion of $V(\theta)$, and be found in Eq. (4)

$$A_v = \frac{(2v+1)}{2} \int_0^\pi V(\theta) P_v(\cos(\theta)) \sin(\theta) d\theta \quad (4)$$

By utilizing Eq. (2) and Eq. (3) as boundary conditions, Eq. (1) becomes $$p(R, \theta, t) = i\rho c U_0 e^{-i\omega t} \sum_{v=0}^{\infty} A_v P_v(\cos(\theta)) \frac{h_v(kR)}{h_v'(ka)} \quad (5)$$

here $h_v'(x)$ is the derivative of $h_v(x)$, with respect to the argument of x. The acoustic far field beam pattern in logarithmic format is defined as $$BP(\theta) = 20\log_{10} \left| \frac{p(R, \theta)}{[p(R, \theta)]_{max}} \right|_{R \to \infty} \quad (6)$$

Utilizing Eq. (5), the above equation becomes $$BP(\theta) = 20\log_{10} \left| \frac{\sum_{v=0}^{\infty} A_v P_v(\cos(\theta)) \frac{h_v(kR)}{h_v'(ka)}}{\left[\sum_{v=0}^{\infty} A_v P_v(\cos(\theta)) \frac{h_v(kR)}{h_v'(ka)}\right]_{max}} \right|_{R \to \infty} \quad (7)$$

The spherical Hankel function asymptotic forms become, $$\begin{cases} h_v(x)|_{x \to \infty} \approx \left.\frac{e^{i(x-a_v\pi)}}{x}\right|_{x=kR} \\ h_v'(x)|_{x \to \infty} \approx \left.\frac{(ix-1)e^{i(x-a_v\pi)}}{x^2}\right|_{x=ka} \end{cases} \quad (8)$$

and under the far field conditions $$kR \to \infty, \quad (9)$$

for $h_v(x)|_{x=kR}$ and $$ka \to \infty, \quad (10)$$

for $h_v'(x)|_{x=ka}$. To all degrees of v, Legendre polynomials have $$P_v(\cos\theta)|_{Maximum} = 1 \quad (11)$$

when $\theta=0$ is the maximum view direction at main lobe. Applying Eq. (8) and Eq. (11), Eq. (7), become $$BP(\theta) \approx 20\log_{10} \left| \frac{\sum_{v=0}^{\infty} A_v P_v(\cos\theta)}{\sum_{v=0}^{\infty} A_v} \right|_{\substack{kR \to \infty \\ ka \to \infty}} = 20\log_{10} \left| \frac{V(\theta)}{\sum_{v=0}^{\infty} A_v} \right|. \quad (12)$$

The physics behind Eq. (12) is that the far field acoustic beam pattern is the same as the normalized particle velocity (or shading) angular distribution on the surface of the spherical transducer or array, and the beam pattern becomes frequency independent under Hankel asymptotic conditions of Eq. (9) and Eq. (10). More simply, the far field beam pattern is proportional to the shading function on the surface of the array. To achieve a certain shape of angular distribution far field beam patterns, the same types of angular excitation (or shading for receivers) on the normal surface of the spherical transducer or array need to be engineered under the asymptotic conditions. The asymptotic condition of Eq. (9) can always be satisfied, because of the definition of far field beam pattern Eq. (6). However, the second asymptotic condition to Hankel function in Eq. (10) may be restrained by physical dimension of the sphere and the operating frequency that ka, or a/$\lambda$, becomes an important design parameter for constant beam pattern (CBP) transducer engineering. Here, a is the radius of the spherical transducer or array, and $\lambda$ is the wavelength of the frequency interested.

The concept of acoustic constant beam pattern (CBP) transducer is introduced where its beam patterns are independent of frequency in a wide band. The theory and numerical simulations for the constant beam pattern transducer design are studied and described. The far-field beam pattern shows the same distribution as the normal directional radial particle velocity distribution, or shading function on the spherical transducer or array surface, under the spherical Hankel function asymptotic approximation conditions. In other words, the far-field beam pattern is proportional to the normal radial particle velocity distributions and to the shading function on the array surface. Any arbitrary shading functions are expandable by Legendre series, per Sturm-Liouville theory. Classic Dolph-Chebyshev shading of equal side lobes can be achieved by Legendre polynomial expansion for spherical transducers. The narrower the beam width, the higher degree Legendre polynomials that must be involved such that a larger control parameter of a/$\lambda$ may be required, in order to control small ripples to the side lobes for achieving ideal constant beam pattern (CBP) transducers.

Several numerical examples are simulated by the Rayleigh integral method to verify the wave equation beam pattern solution in Eq. (12) under various a/λ, conditions $$p(x, y, z) = -\frac{i\rho\omega}{2\pi} \int_{S_0} \frac{e^{ikR}}{R} (U_0 V(\theta)) \hat{n} \cdot d\vec{S}_0, \tag{13}$$

Where $V(\theta)$ is defined in Eq. (2) as the radial particle velocity distribution in its normal direction with $\hat{n}$ as a unit vector on the surface $S_0(x_0, y_0, z_0)$ for the sphere of radius a, and $$R = \sqrt{(x-x_0)^2 + (y-y_0)^2 + (z-z_0)^2}, \tag{14}$$

is the distance between the active surface element and the far field point.

Simulations have shown that this method and apparatus is effective for a variety of shadings including shading by a single Legendre polynomial, $P_5 = (\cos(\theta))$; shading by a Chebyshev polynomial of the first kind, $T_5 = (\cos(\theta))$ shading by the classic Dolph-Chebyshev technique for −26 dB sidelobe control, $T_9(z_0 \cos(\theta))$; shading by a cosine function of cubic power, $(\cos(\theta))^3$; shading by a Gaussian shaped spherical surface particle velocity function; and shading by a Legendre polynomial of high degree for narrow bandwidth. These shadings have been modeled utilizing a spherical transducer or array design with a known radius, resulting in an axisymmetric beam pattern. Thus, this method and apparatus can be used to create an arbitrary, axisymmetric beam pattern utilizing the described system.

Figure 2A:
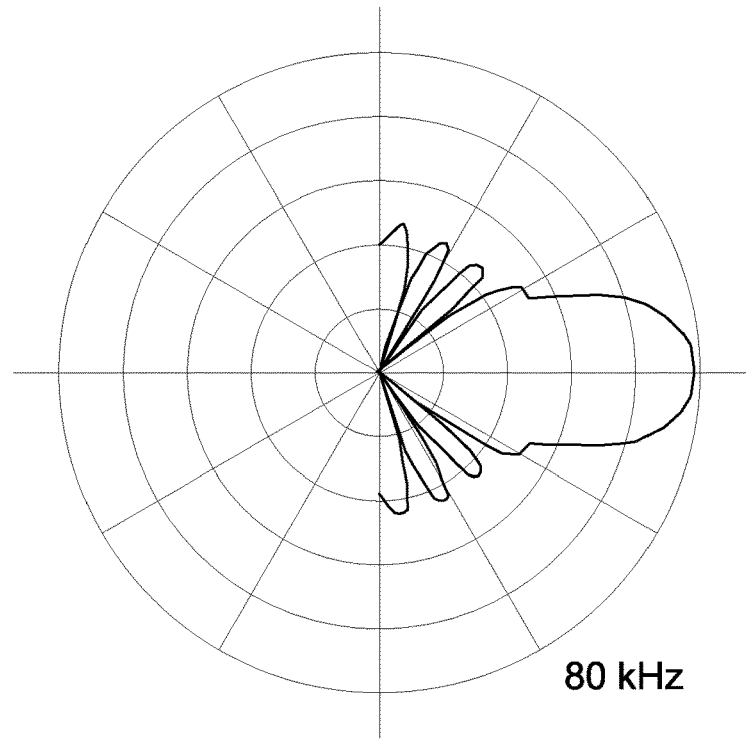
FIGS. 2A-2C are polar graphs of beam patterns of −50 dB to 0 dB scale, modeled in accordance with the shading function specified in FIG. 1.
Figure 2B:
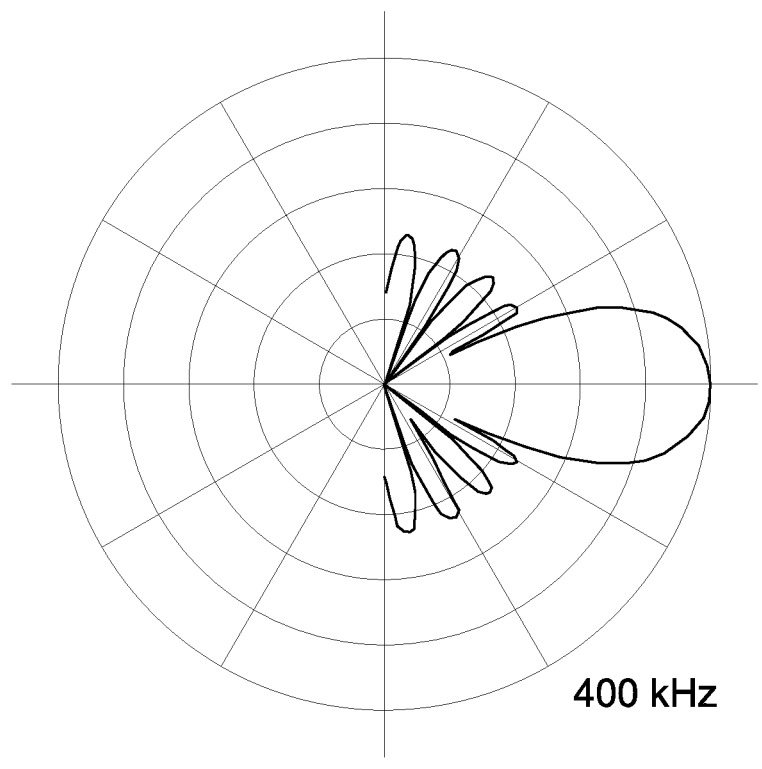
Figure 2C:
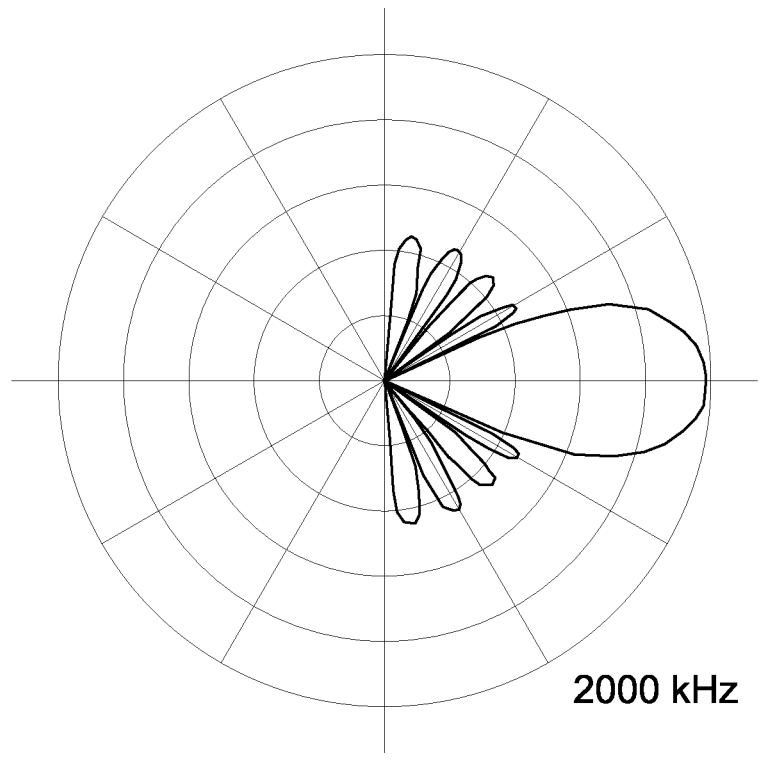

FIG. 1 shows the normalized shading function $V(\theta)$ by Chebyshev polynomial $T_9(z_0 \cos(\theta))$ for a −26 dB sidelobe suppression $$V(\theta) = \begin{cases} T_9(z_0 \cos(\theta)) & 0 \le \theta \le \pi/2 \\ 0 & \text{Other} \end{cases} \tag{15}$$

where $z_0$ equals 1.09. The $V(\theta)$ in equation (15) can be expanded by a summation of Legendre polynomials per equation (3) and equation (4). By Rayleigh integral numerical method of equation (13), the associated polar graph beam patterns at various frequencies are displayed in FIG. 2A for 80 kHz, FIG. 2B for 400 kHz, and FIG. 2C for 2000 kHz, where the beam patterns are kept as constant shapes with all side-lobes around −26 dB for frequencies greater than 140 kHz, or dimensionless parameter a/λ greater than 32.6. Here, the spherical transducer has a radius of 0.349 meters, and all of the polar graphs of logarithmic scale from −50 dB to the main lobe peak of 0 dB.

Another modeled beam pattern is a cubed cosine function. The simulation example here is for a high power order cosine form on the surface of a rigid hemisphere of radius 0.349 meters:

$$V(\theta) = \begin{cases} (\cos(\theta))^3 & 0 \le \theta \le \pi/2 \\ 0 & \text{Other} \end{cases} \tag{16}$$

This can also be expressed by Legendre polynomials as:

$$(\cos(\theta))^3 = 0.6 P_1(\cos(\theta)) + 0.4 P_3(\cos(\theta)). \tag{17}$$

Figure 3:
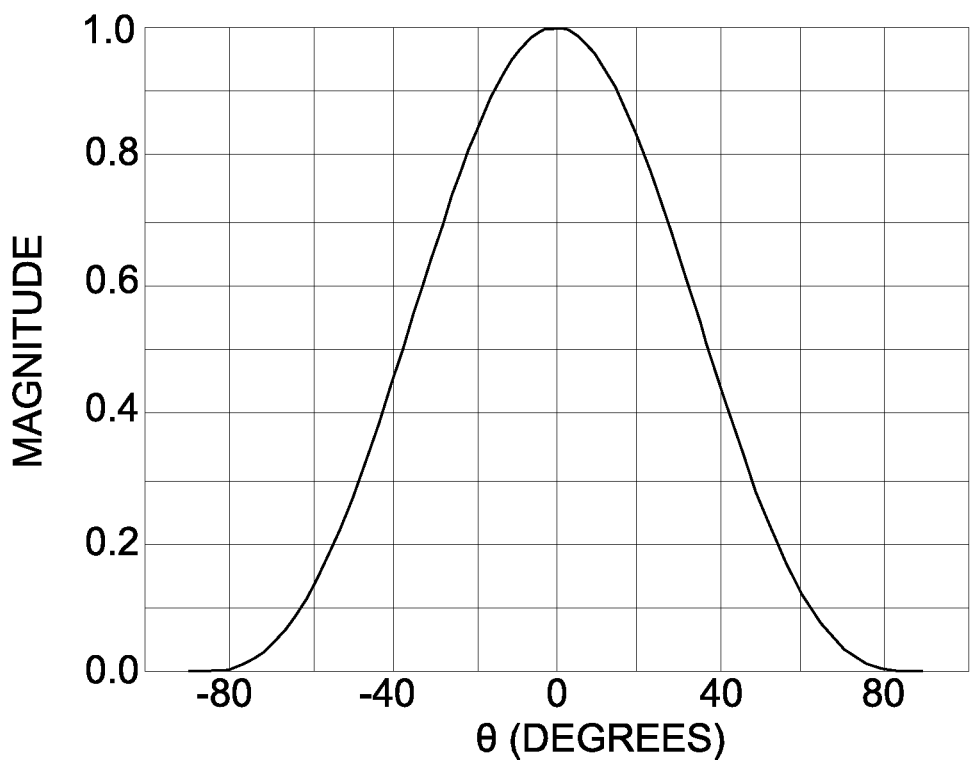
FIG. 3 is a graph of a cubed cosine shading function utilized in array design.
Figure 4A:
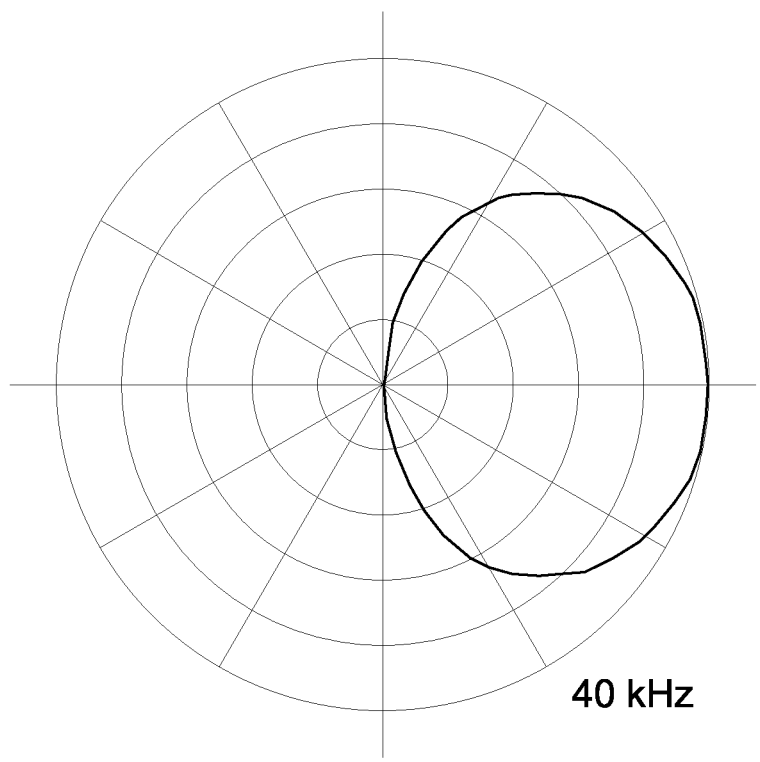
FIGS. 4A-4C are −50 dB to 0 dB scale polar graphs of beam patterns modeled in accordance with the shading function specified in FIG. 3.
Figure 4B:
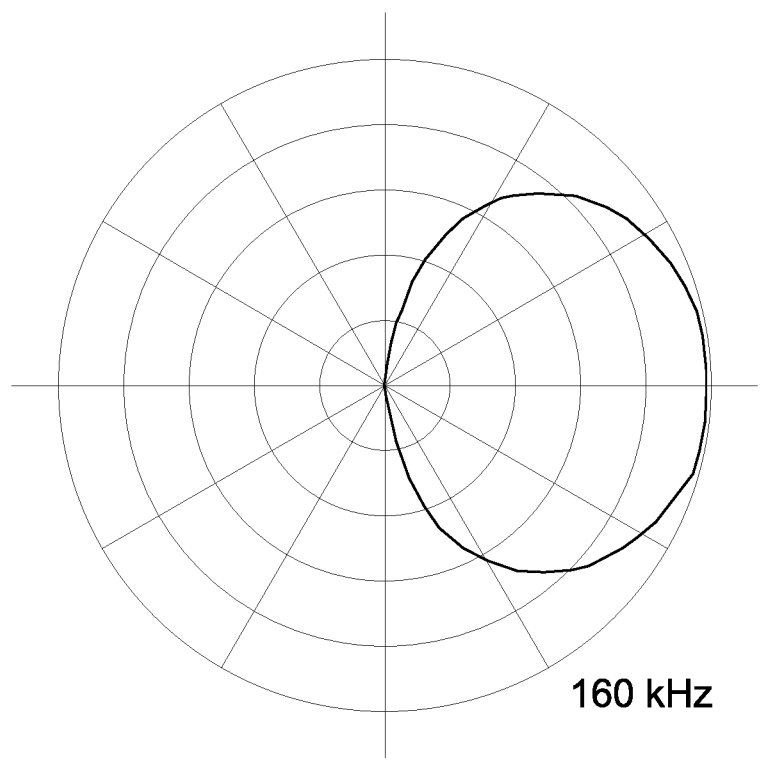
Figure 4C:
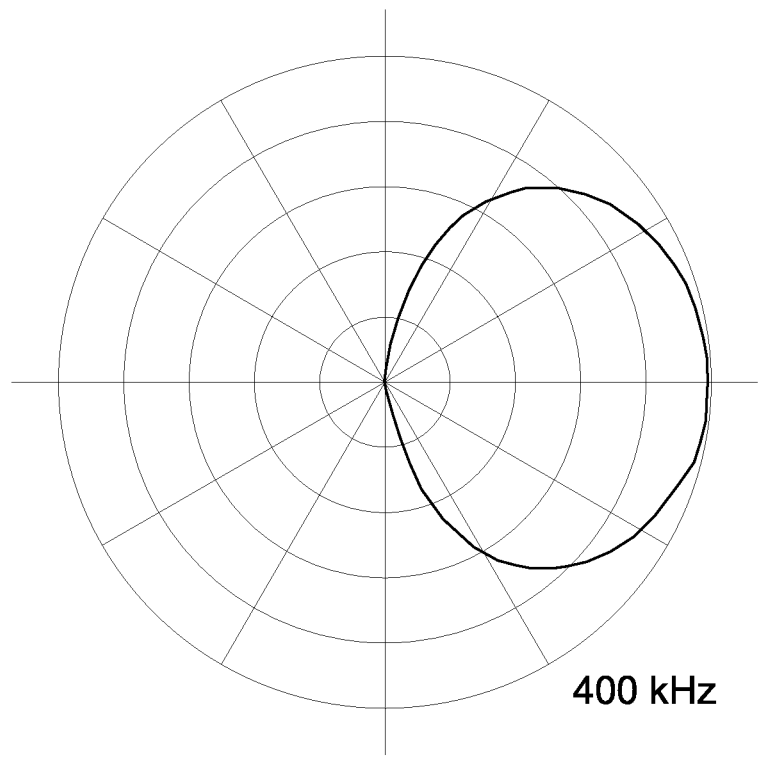

The radial shading function of $(\cos(\theta))^3$ is shown in FIG. 3. Associated constant beam patterns for the $(\cos(\theta))^3$ shading function are shown in polar graph FIG. 4A for 40 kHz, FIG. 4B for 160 kHz, and FIG. 4C for 400 kHz. The dimensionless ratio of the radius to the wavelength, a/λ, is about 9.3 at 40 kHz and 92.8 at 400 kHz. This model again shows that a constant beam pattern spherical transducer can be realized over a decade frequency band.

Figure 5:
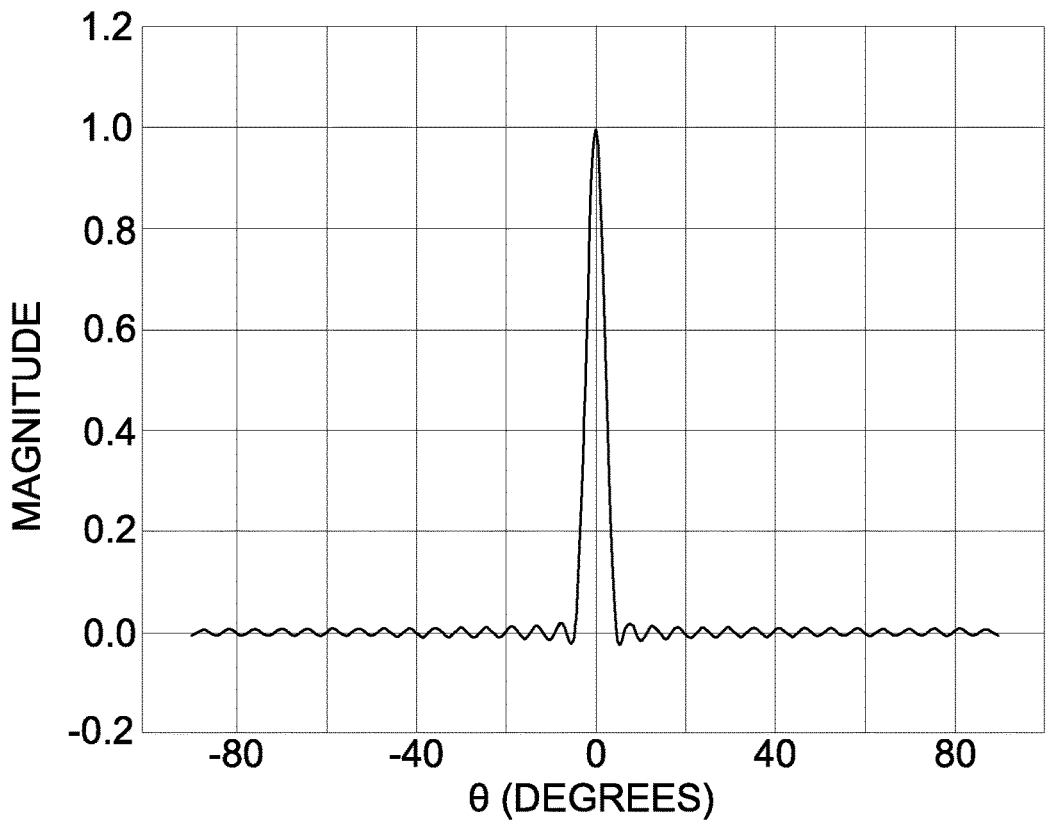
FIG. 5 is a graph of a narrow beam width shading function utilizing a Legendre polynomial $P_{62}$.
Figure 6A:
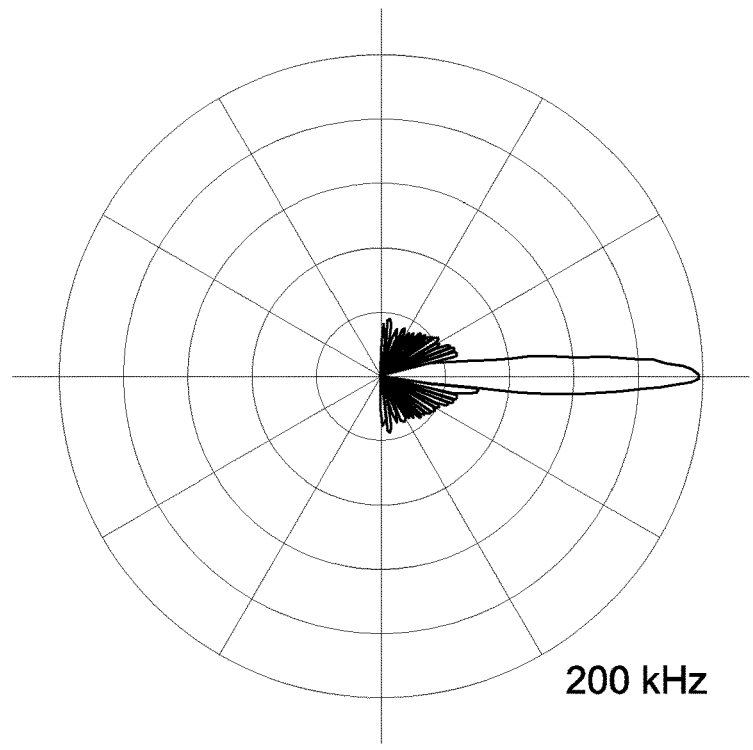
FIGS. 6A-6C are −50 dB to 0 dB scale polar graphs of beam patterns modeled in accordance with the shading function specified in FIG. 5.
Figure 6B:
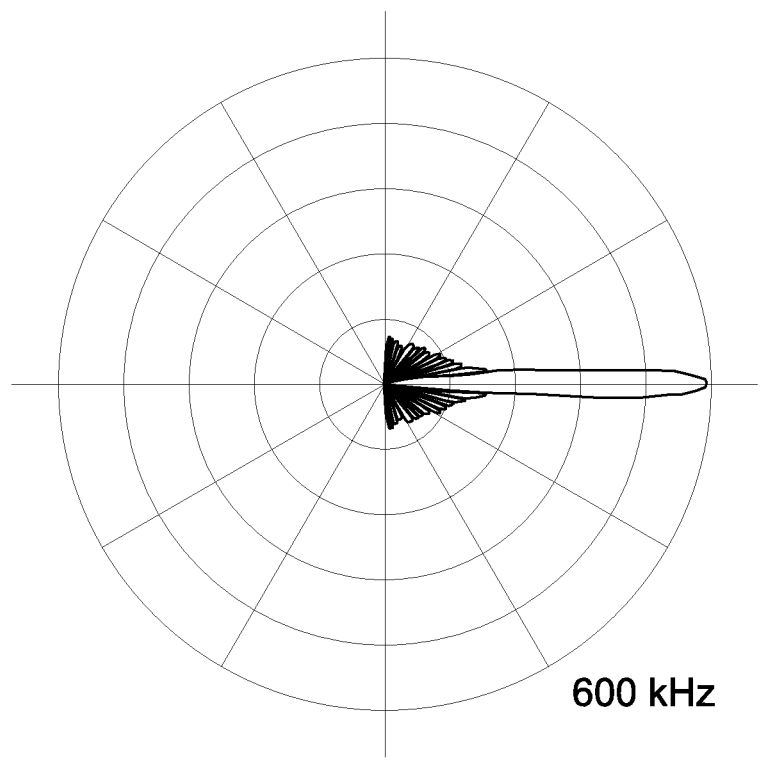
Figure 6C:
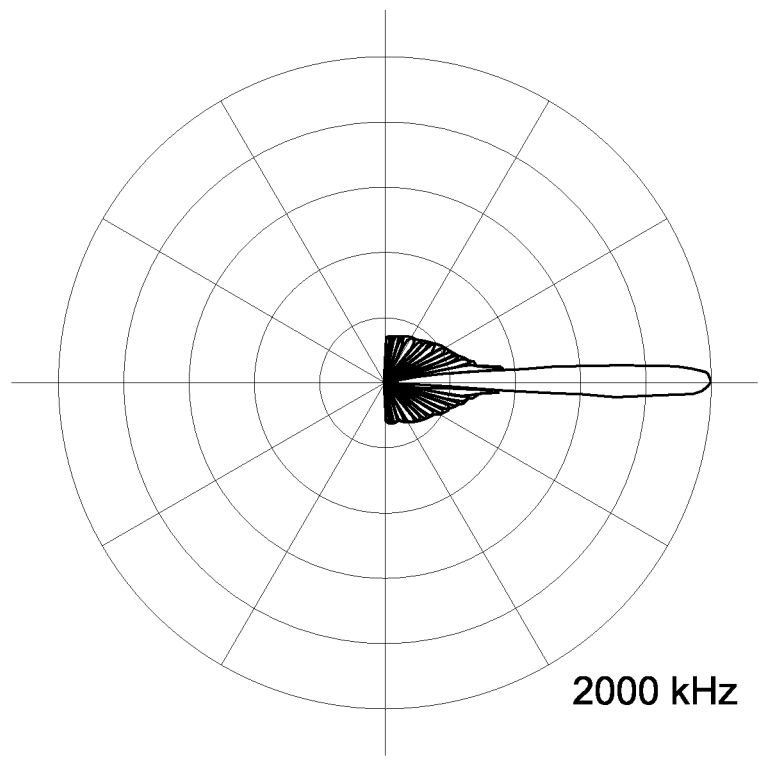

A narrow beam width simulation for a 0.94 meter radius hemispherical transducer or array example was formulated utilizing a single high degree Legendre polynomial $P_{62}$, as follows:

$$V(\theta) = \begin{cases} P_{62}(z_0 \cos(\theta)) & 0 \le \theta \le \pi/2 \\ 0 & \text{Other} \end{cases} \tag{18}$$

where $z_0$ is 1.0025. FIG. 5 shows the hemispherical shading distribution. Far field beam pattern representations are shown in FIG. 6A for 200 kHz, FIG. 6B for 600 kHz, and FIG. 6C for 2000 kHz. (Representations are used because the detail of the side-lobes in original data is too fine to show accurately.) A 62 degree Legendre polynomial is necessary to suppress the side lobes as shown in FIG. 5. The Legendre function degree can be reduced by increasing power in the side lobes. Utilizing this method, a shading function can be calculated for axisymmetric beam patterns that are constant over a wide frequency range.

Figure 7:
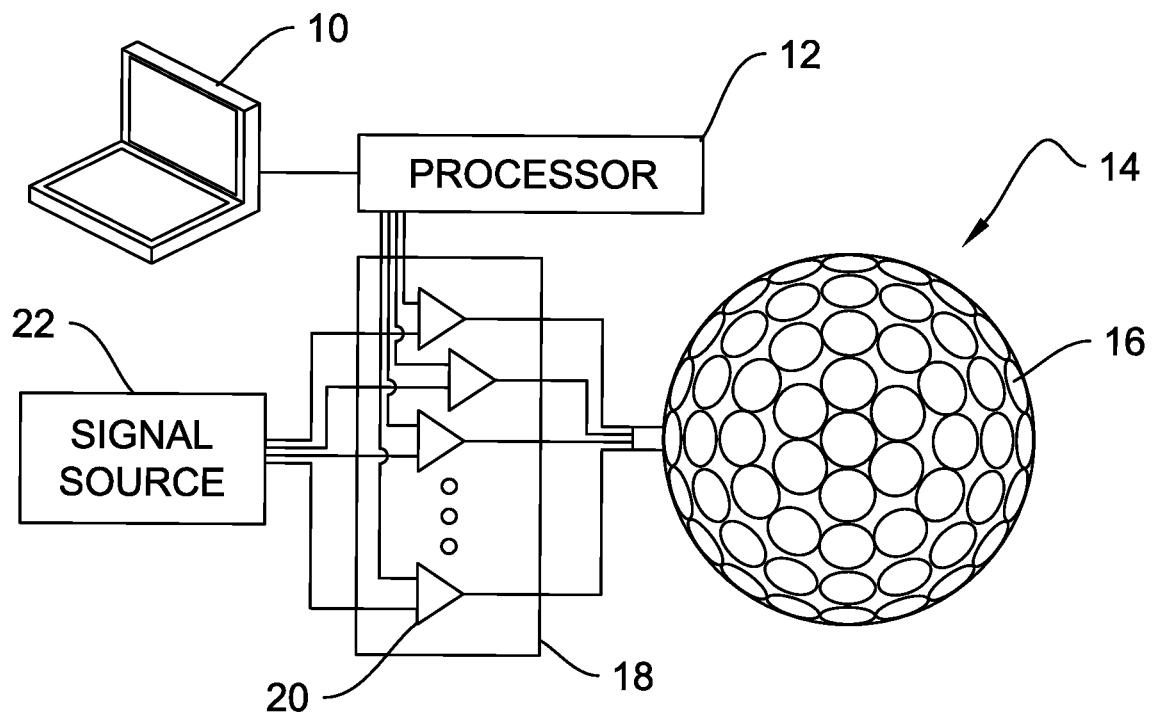
FIG. 7 is a block diagram of an apparatus for practicing the method herein.

FIG. 7 provides a diagram showing one embodiment of an apparatus for this method. A user can provide a chosen symmetric beam pattern at terminal 10. The beam pattern can be selected from known shading functions or the user can specify maximum lobe directions and nulls for the beam pattern. Other parameters such as a maximum or average power level can be selected by the user. These power levels can be associated with the entire array or one specific transducer. It may be desirable to limit array power to the calculated maximum power of the transducer in the maximum lobe of the beam pattern. A processor 12 calculates shading weights for each transducer in accordance with the provided beam pattern, provided power level, the equations provided above, and the known transducer array 14. Transducer array 14 is made from a plurality of transducers 16, each oriented towards a specific angle. Preferably transducers 16 are positioned in a regular three dimensional spherical array in order to simplify computation of the shading weights. Processor 12 can divide shading weights among several transducers 16 in order to create a fit with the beam pattern. Array 14 is joined to a bank of amplifiers 18. For maximum versatility, each amplifier 20 in the bank of amplifiers 18 is joined to one transducer 16; however, amplifiers 20 can also be joined to groups of transducers such as those at a specific bearing from a given bearing. Processor 12 is joined to bank of amplifiers 18 to provide shading weights associated with each transducer 16. These shading weights are translated into voltage gains or attenuations by the bank of amplifiers 18. A signal source 22 is further joined to bank of amplifiers 18. Signal source 22 is provided to each amplifier 20 without a time delay. Each amplifier 20 amplifies or attenuates the source 22 in accordance with the calculated shading weight.

Figure 8:
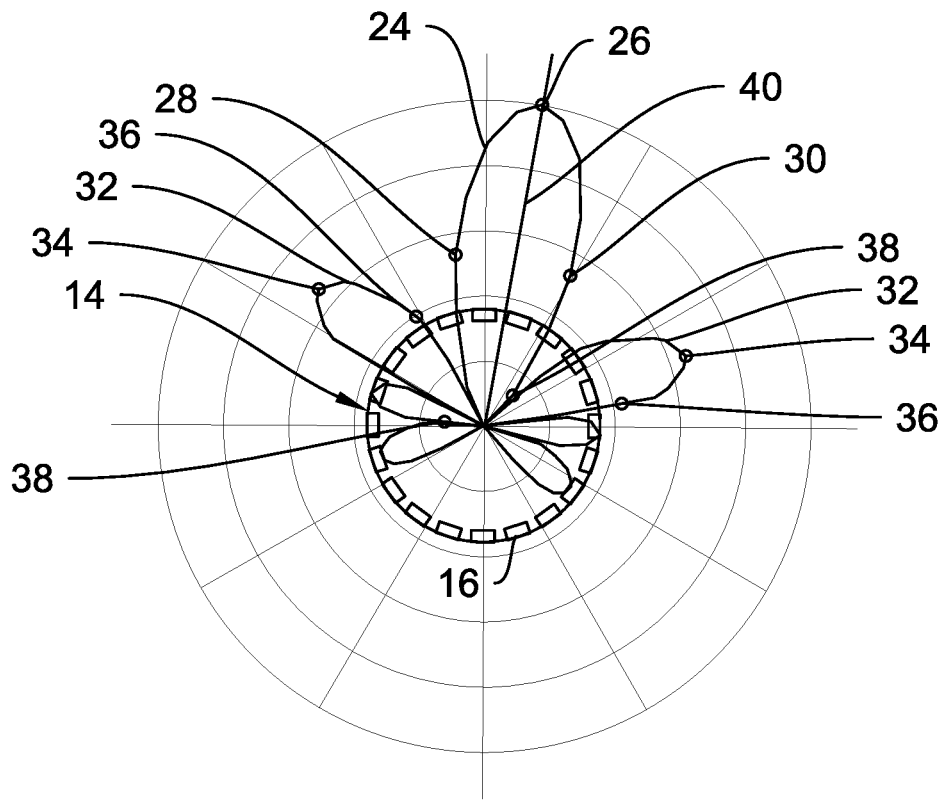
FIG. 8 is a polar graph illustrating user specification of a beam pattern.

FIG. 8 provides a beam pattern 24 having transducer array 14 superimposed thereon. This illustrates how a user or other routine can specify an arbitrary beam pattern for calculation by the current method. User can place a point 26 indicating main lobe bearing angle, which is then aligned with z-axial direction for the spherical coordinates used for equations (1) and equation (13). If the main lobe bearing angle does not correspond directly with an array transducer, the amplification or shading can be split among the next nearest array transducers. Auxiliary points 28 and 30 can be placed to indicate main lobe shape. Side lobes 32 can be specified using side lobe maximum points 34 and shapes 36. Nulls 38 can also be specified. After generally specifying a beam pattern, the user can identify an axis of rotation 40 for rotation of the two dimensionally specified beam pattern into the three dimensional, axisymmetric beam pattern required by this method.

Other methods, such as drawing a beam pattern can also be utilized. After specifying the preferred beam pattern, processor 12 can utilize a variety of methods to fit known shading functions to the points identified by the user. Transducers in the array can be associated with the user defined rotated beam pattern. Shading or amplification values for each transducer can be calculated by processor 12. A required operating band width and maximum array radius can also be used as design constraints. The specified beam pattern can be realized according to the method described above.

Other data entry methods can be utilized to specify the beam pattern. For example, a user can specify an envelope indicating the maximum beam or a null for a given bearing and a rotation axis. The processor can then develop a shading function that will fit the specified three dimensional envelope.

It will be understood that many additional changes in the details, materials, steps and arrangement of parts, which have been herein described and illustrated in order to explain the nature of the invention, may be made by those skilled in the art within the principle and scope of the invention as expressed in the appended claims.

The foregoing description of the preferred embodiments of the invention has been presented for purposes of illustration and description only. It is not intended to be exhaustive, nor to limit the invention to the precise form disclosed; and obviously, many modification and variations are possible in light of the above teaching. Such modifications and variations that may be apparent to a person skilled in the art are intended to be included within the scope of this invention as defined by the accompanying claims.

What is claimed is:

1. A method for providing a broadband constant beam pattern acoustic array:
   providing an array of transducers in a known three dimensional axisymmetric configuration with each transducer having an associated signal;
   receiving user specified beam pattern parameters for a three dimensional axially symmetric beam at a projected far field range of the array of transducers;
   calculating a normal angular particle velocity distribution from the user specified beam pattern parameters by assuming Hankel asymptotic conditions and utilizing Legendre polynomials;
   determining a bearing for each transducer of the array of transducers corresponding with the user specified beam pattern parameters;
   obtaining a user specified beam pattern power level;
   calculating weightings for each transducer in accordance with the calculated normal angular particle velocity distribution and as being proportional to the obtained beam pattern power level and associated with the bearing for each transducer;
   modifying a power level of the signal associated with each transducer in accordance with the calculated weighting for that transducer; and
   operating the array of transducers for transmitting the signal at each transducer.

2. The method of claim 1, wherein the provided array of transducers is spherical having a known radius and transducer spacing with the transducers arranged in an axisymmetric pattern.

3. The method of claim 2, further comprising the step of obtaining a user defined range of frequencies over which the user specified beam pattern will be maintained wherein the known radius is selected to maintain the user specified beam pattern over the user defined range of frequencies.

4. The method of claim 1, wherein the step of obtaining a user specified beam pattern power level further comprises receiving a power level associated with at least one transducer of the array of transducers.

5. The method of claim 1, further comprising the step of optimizing the user specified beam pattern parameters.

6. A method for providing a broadband constant beam pattern acoustic array:
   providing an array of transducers in a known three dimensional axisymmetric configuration with each transducer having an associated signal;
   receiving user specified beam pattern parameters for a three dimensional axially symmetric beam at a projected far field range of the array of transducers;
   calculating a normal angular particle velocity distribution from the user specified beam pattern parameters by assuming Hankel asymptotic conditions and utilizing Legendre polynomials;
   determining a bearing for each transducer of the array of transducers corresponding with the user specified beam pattern parameters;
   obtaining a user specified beam pattern power level;
   calculating weightings for each transducer in accordance with the calculated normal angular particle velocity distribution and as being proportional to the obtained beam pattern power level and associated with the bearing for each transducer;
   optimizing the user specified beam pattern parameters by utilizing a known beam pattern function and applying user specified beam pattern parameters to the known beam pattern function;
   modifying a power level of the signal associated with each transducer in accordance with the calculated weighting for that transducer; and
   operating the array of transducers for transmitting the signal at each transducer.

7. The method of claim 5, wherein the user specified beam pattern has side lobes with side lobe power levels, and the step of optimizing the user specified beam pattern comprises increasing side lobe power levels to reduce the degree of Legendre polynomials.

8. The method of claim 1, wherein the step of receiving a user specified beam pattern further comprises receiving a one plane beam pattern and an axis of rotation whereby the user specified beam pattern is a rotation of the one plane beam pattern about the axis of rotation.

\* \* \* \* \*